(12) United States Patent  
Toyoshima et al.

(10) Patent No.: US 12,486,892 B2
(45) Date of Patent: Dec. 2, 2025

(54) TRANSMISSION

(71) Applicants: JATCO Ltd, Fuji (JP); NISSAN MOTOR CO., LTD., Yokohama (JP)

(72) Inventors: Tahei Toyoshima, Isehara (JP); Hyunhwan Lee, Bucheon (KR); Akira Tsuchida, Sagamihara (JP); Masahiro Kouya, Hiratsuka (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/846,395

(22) PCT Filed: Oct. 24, 2022

(86) PCT No.: PCT/JP2022/039494
§ 371 (c)(1),
(2) Date: Sep. 12, 2024

(87) PCT Pub. No.: WO2023/181471
PCT Pub. Date: Sep. 28, 2023

(65) Prior Publication Data
US 2025/0189032 A1 Jun. 12, 2025

(30) Foreign Application Priority Data
Mar. 23, 2022 (JP) ................... 2022-046422

(51) Int. Cl.
*F16H 57/04* (2010.01)
*F16H 9/18* (2006.01)
(Continued)

(52) U.S. Cl.
CPC .......... *F16H 57/0424* (2013.01); *F16H 9/18* (2013.01); *F16H 37/0813* (2013.01);
(Continued)

(58) Field of Classification Search
CPC .... F16H 57/0424; F16H 9/18; F16H 37/0813; F16H 57/021; F16H 57/031;
(Continued)

(56) References Cited

U.S. PATENT DOCUMENTS 8,931,596 B2 * 1/2015 Shioiri ................ F16H 57/0423
184/6.12
9,528,593 B2 * 12/2016 Tage ....................... F16H 3/089
(Continued)

FOREIGN PATENT DOCUMENTS

JP 2012-102818 A 5/2012

*Primary Examiner* — Henry Y Liu
(74) *Attorney, Agent, or Firm* — Foley & Lardner LLP (57) ABSTRACT

A transmission includes: a case configured to store oil; a gear power transmission mechanism supported by the case and configured to operate in a state where a part of the gear power transmission mechanism is immersed in the oil stored in the case; a chain power transmission mechanism supported by the case; and a transmission mechanism supported by the case. The case includes a rib configured to cover the chain power transmission mechanism at an upper side of the chain power transmission mechanism in a vertical direction. The rib internally includes an oil passage for supplying oil to the transmission mechanism.

4 Claims, 4 Drawing Sheets

(51) Int. Cl.
*F16H 37/08* (2006.01)
*F16H 57/021* (2012.01)
*F16H 57/031* (2012.01)
*F16H 57/035* (2012.01)
*F16H 57/05* (2006.01)
*F16H 61/662* (2006.01)

(52) U.S. Cl.
CPC ......... *F16H 57/021* (2013.01); *F16H 57/031* (2013.01); *F16H 57/035* (2013.01); *F16H 57/0457* (2013.01); *F16H 57/0489* (2013.01); *F16H 57/0495* (2013.01); *F16H 57/05* (2013.01); *F16H 61/662* (2013.01)

(58) Field of Classification Search
CPC ............... F16H 57/035; F16H 57/0457; F16H 57/0489; F16H 57/0495; F16H 57/05; F16H 61/622; F16H 57/04
USPC .......................................................... 474/28
See application file for complete search history.

(56) References Cited

U.S. PATENT DOCUMENTS

| | | | |
|---|---|---|---|
| 9,856,971 B2* | 1/2018 | Mikami | F16H 57/045 |
| 10,220,698 B2* | 3/2019 | Shibata | F16H 3/727 |
| 10,704,668 B2* | 7/2020 | Okumura | F16H 57/0424 |
| 10,876,620 B2* | 12/2020 | Suwa | F16H 57/0426 |
| 11,079,004 B2* | 8/2021 | Ishikawa | F16H 57/0476 |
| 11,466,770 B2* | 10/2022 | Fujii | F16H 57/021 |
| 11,828,358 B2* | 11/2023 | Nakata | F16H 57/0426 |
| 12,092,202 B2* | 9/2024 | Nakano | F16H 57/0489 |
| 2011/0192245 A1* | 8/2011 | Shioiri | F16H 57/0423 74/467 |
| 2011/0244999 A1* | 10/2011 | Nakamura | F16H 57/023 474/140 |
| 2014/0155214 A1* | 6/2014 | Kimura | F16H 57/045 475/160 |
| 2015/0204436 A1* | 7/2015 | Mafune | F16H 57/0409 475/160 |
| 2016/0033028 A1* | 2/2016 | Tage | F16H 57/0457 74/606 R |
| 2016/0123455 A1* | 5/2016 | Mikami | F16H 57/045 74/467 |
| 2016/0186855 A1* | 6/2016 | Tahara | F16H 57/0424 74/413 |
| 2018/0163843 A1* | 6/2018 | Noguchi | F16H 57/0483 |
| 2019/0277394 A1* | 9/2019 | Okumura | F16H 57/04 |
| 2020/0240511 A1* | 7/2020 | Hori | F16H 57/0421 |
| 2020/0332883 A1* | 10/2020 | Fujii | F16H 57/0471 |
| 2020/0408297 A1* | 12/2020 | Ishikawa | B60K 17/04 |
| 2021/0190201 A1* | 6/2021 | Shimokobe | H02K 9/19 |
| 2022/0282783 A1* | 9/2022 | Nakata | F16H 57/045 |
| 2022/0286011 A1* | 9/2022 | Nakata | F16H 57/0424 |

* cited by examiner

V-V CROSS-SECTION

FIG. 5

TRANSMISSION

TECHNICAL FIELD

The present invention relates to a transmission.

BACKGROUND ART

Patent Document 1 discloses a configuration in which a driven sprocket of an oil pump driven by a chain is immersed in oil stored in a case to lubricate a drive sprocket, the driven sprocket, and the chain.

Further, in this configuration, a space in which the oil is stored is divided into a space in which the driven sprocket is disposed and a space in which an oil strainer is disposed by a baffle plate, and air in the oil increased by the driven sprocket and the chain stirring the oil is prevented from being sucked by the oil pump via the oil strainer.

PRIOR ART DOCUMENT

Patent Document

Patent Document 1: JP 2012-102818 A.

SUMMARY OF INVENTION

However, in the above-described structure, the drive sprocket and the chain that drive the driven sprocket are not covered with the baffle plate. For this reason, there is a possibility that oil wound up by a gear power transmission mechanism including a final gear or the like is splashed on the drive sprocket or the chain to become a smaller spray, and the air contained in the oil increases.

The present invention has been made in view of such a technical problem, and an object of the present invention to prevent oil wound up by a gear power transmission mechanism from being splashed on a chain power transmission mechanism.

According to an aspect of the present invention, there is provided a transmission including a case configured to store oil; a gear power transmission mechanism supported by the case and configured to operate in a state where a part of the gear power transmission mechanism is immersed in the oil stored in the case; a chain power transmission mechanism supported by the case; and a transmission mechanism supported by the case, in which the case includes a rib configured to cover the chain power transmission mechanism at an upper side of the chain power transmission mechanism in a vertical direction, and the rib internally includes an oil passage for supplying oil to the transmission mechanism.

According to the above aspect, a rib functions as a partition wall that partitions a gear power transmission mechanism and a chain power transmission mechanism from each other, and oil wound up by the gear power transmission mechanism is prevented from being splashed on the chain power transmission mechanism. Accordingly, the oil splashed on the chain power transmission mechanism is prevented from becoming a further small spray, and an increase in an amount of air contained in the oil can be prevented. Since the rib has a plurality of functions of the partition wall and an oil passage, a limited space in a transmission can be effectively used.

DESCRIPTION OF EMBODIMENTS

Hereinafter, a vehicle 100 including a transmission 10 according to an embodiment of the present invention will be described with reference to the accompanying drawings.

Figure 1:
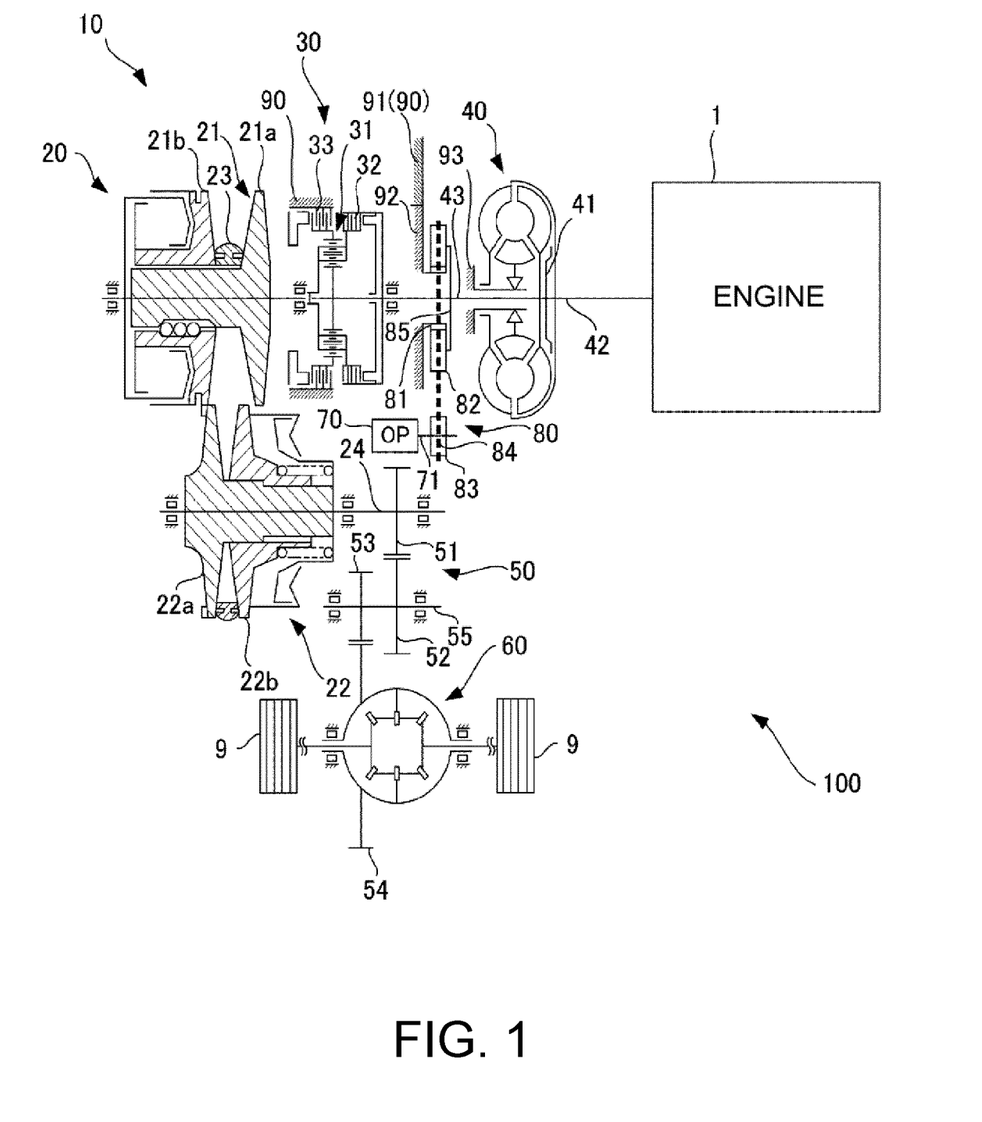
FIG. 1 is a schematic diagram for illustrating a schematic configuration of a vehicle including a transmission according to an embodiment of the present invention.

FIG. 1 is a schematic diagram for illustrating a schematic configuration of the vehicle 100. As illustrated in FIG. 1, the vehicle 100 includes an engine 1, and the transmission 10 provided in a power transmission path connecting the engine 1 and driving wheels 9.

The transmission 10 is a belt continuously variable transmission including a variator 20, a forward/reverse switching mechanism 30, a torque converter 40, a gear power transmission mechanism 50, a differential gear device 60, an oil pump (OP) 70, a chain power transmission mechanism 80, a case 90, and a case cover 93 attached to an opening of the case 90.

In the vehicle 100, rotation generated in the engine 1 is transmitted to the driving wheels 9 via the torque converter 40, the forward/reverse switching mechanism 30, the variator 20 serving as a transmission mechanism, the gear power transmission mechanism 50, and the differential gear device 60.

The torque converter 40 has a lock-up clutch 41, and when the lock-up clutch 41 is engaged, an input shaft 42 and an output shaft 43 of the torque converter 40 are directly connected, and the input shaft 42 and the output shaft 43 rotate at the same speed.

The variator 20 includes a primary pulley 21 and a secondary pulley 22 that are arranged such that V-shaped grooves are aligned, and a belt 23 that is wound around the V-shaped grooves of the pulleys 21 and 22.

The engine 1 is disposed coaxially with the primary pulley 21, and the torque converter 40 and the forward/reverse switching mechanism 30 are provided between the engine 1 and the primary pulley 21 in this order from an engine 1 side.

The forward/reverse switching mechanism 30 includes a double pinion planetary gear set 31 as a main component, a sun gear thereof is coupled to the output shaft 43 of the torque converter 40, and a carrier thereof is coupled to the primary pulley 21 of the variator 20. The forward/reverse switching mechanism 30 further includes a forward clutch 32 that directly connects the sun gear and the carrier of the double pinion planetary gear set 31, and a reverse brake 33 that fixes a ring gear. When the forward clutch 32 is engaged, input rotation from the output shaft 43 is transmitted to the primary pulley 21 without changing a rotation direction, and when the reverse brake 33 is engaged, the input rotation from the output shaft 43 is reversed and is transmitted to the primary pulley 21.

The forward clutch 32 is engaged by being supplied with a clutch pressure from a hydraulic control valve unit (not illustrated) when a forward traveling mode is selected as a traveling mode of the vehicle 100. The reverse brake 33 is engaged by being supplied with a brake pressure from the hydraulic control valve unit when a reverse traveling mode is selected as the traveling mode of the vehicle 100.

Rotation of the primary pulley 21 is transmitted to the secondary pulley 22 via the belt 23, and rotation of the secondary pulley 22 is transmitted to the driving wheels 9 via an output shaft 24, the gear power transmission mechanism 50, and the differential gear device 60.

In order to make it possible to change a speed ratio between the primary pulley 21 and the secondary pulley 22 during the above-mentioned power transmission, among conical plates forming the V-shaped grooves of the primary pulley 21 and the secondary pulley 22, one type is referred to as fixed conical plates 21a and 22a, and the other type is referred to as movable conical plates 21b and 22b that can be displaced in an axial direction.

The primary pulley 21 and the secondary pulley 22 operate in accordance with a hydraulic pressure of oil supplied from a control valve unit 95 to an oil chamber of the primary pulley 21 and an oil chamber of the secondary pulley 22.

Specifically, when a primary pulley pressure and a secondary pulley pressure are applied to the oil chambers of the primary pulley 21 and the secondary pulley 22, respectively, the movable conical plates 21b and 22b are biased toward the fixed conical plates 21a and 22a, and power is transmitted between the primary pulley 21 and the secondary pulley 22 by frictional engagement between the belt 23 and the conical plates.

At the time of gear shift, a width of the V-shaped grooves of both the pulleys 21 and 22 is changed by a differential pressure between the primary pulley pressure and the secondary pulley pressure generated corresponding to a target speed ratio, and an arc diameter of the belt 23 wound around the pulleys 21 and 22 is continuously changed, thereby realizing the target speed ratio.

The gear power transmission mechanism 50 includes a first gear 51 provided on the output shaft 24 of the variator 20, a second gear 52 and a third gear 53 provided on an intermediate shaft 55, and a fourth gear 54 fixed to the differential gear device 60.

Figure 2:
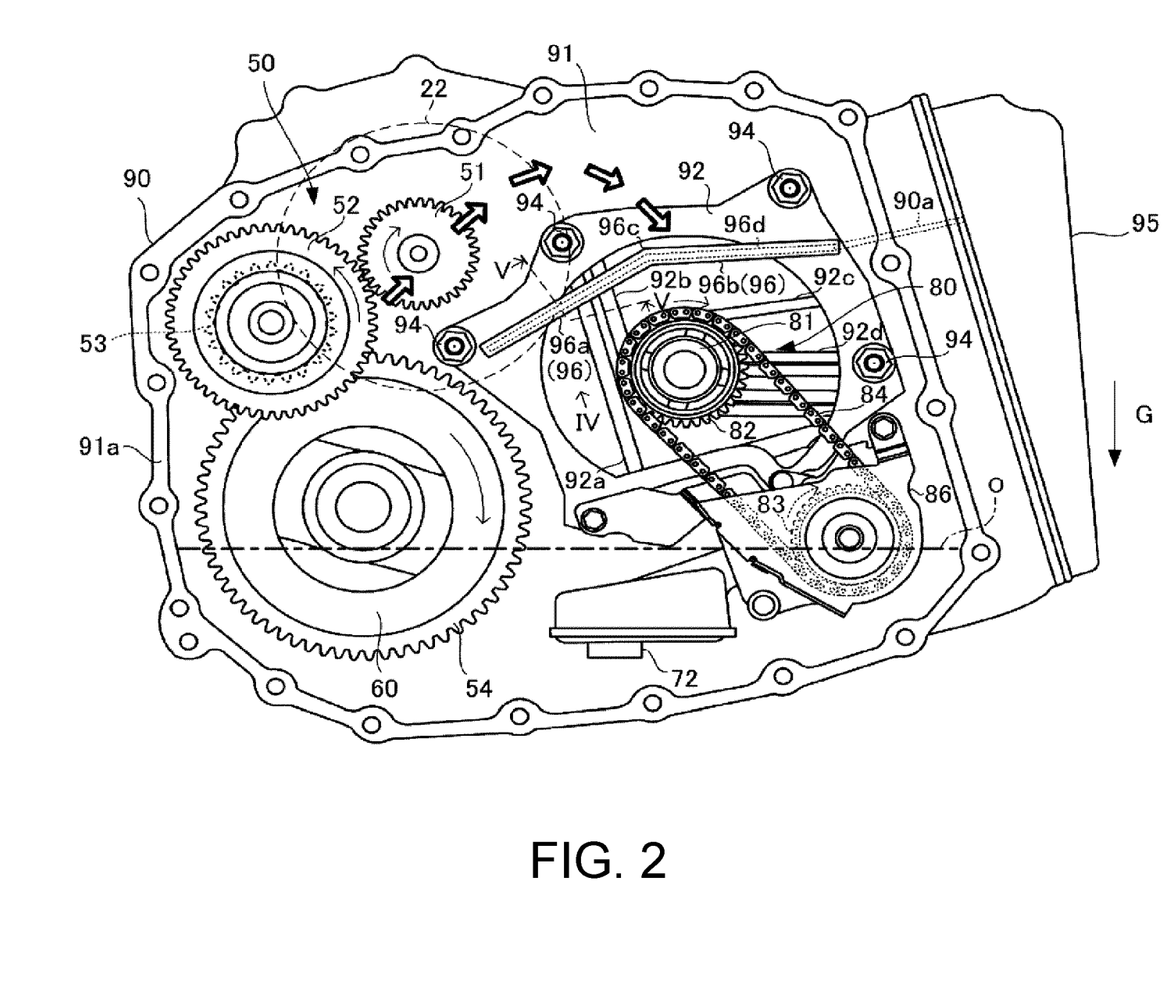
FIG. 2 is a view of the inside of the transmission as viewed from a cover side.

The case 90 includes an intermediate wall 91 and an intermediate cover 92 attached to an opening of the intermediate wall 91 (see FIG. 2). The intermediate wall 91 is a wall perpendicular to an axial direction of the output shaft 43 and the like, and partitions the inside of the case 90 into a space in which the pulleys 21 and 22 and the forward/reverse switching mechanism 30 are accommodated and a space in which the gear power transmission mechanism 50 and the chain power transmission mechanism 80 are accommodated. Oil is stored in a bottom portion of the case 90. That is, the case 90 forms an oil bath in which oil is stored.

The intermediate cover 92 is provided between the torque converter 40 and the forward/reverse switching mechanism 30 to cover a torque converter 40 side of the forward/reverse switching mechanism 30.

The chain power transmission mechanism 80 includes a drive sprocket 82 rotatably supported by the intermediate cover 92 via a bush 81, a driven sprocket 83 provided on an input shaft 71 of an oil pump 70, and a chain 84 coupling the drive sprocket 82 and the driven sprocket 83.

The drive sprocket 82 is connected to the output shaft 43 of the torque converter 40 via a connecting member 85. As a result, when the output shaft 43 of the torque converter 40 rotates, the oil pump 70 is driven to supply oil to the control valve unit 95.

The case cover 93 is fixed to the case 90 to cover the gear power transmission mechanism 50 and the chain power transmission mechanism 80.

Next, an internal configuration of the transmission 10 will be described in detail with reference to FIGS. 2 to 5.

FIG. 2 is a view of the inside of the transmission 10 as viewed from a case cover 93 side. A left-right direction in FIG. 2 corresponds to a front-rear direction of the vehicle 100 (the right direction is the front direction), and a direction perpendicular to a paper surface corresponds to a left-right direction of the vehicle 100 (the depth direction of the page surface is the left direction). A solid arrow G indicates a direction of gravity, and a one-dot chain line indicates a height of an oil surface O of the oil stored in the case 90.

As illustrated in FIG. 2, the gear power transmission mechanism 50 and the differential gear device 60 are supported by the case 90 on a rear side (a left side in FIG. 2) of the vehicle 100 in the transmission 10.

The chain power transmission mechanism 80 is supported by the case 90 on a front side of the vehicle 100 in the transmission 10.

The forward/reverse switching mechanism 30 and the primary pulley 21 are located on a left side (the depth of the page surface) of the vehicle 100 with respect to the drive sprocket 82 of the chain power transmission mechanism 80.

The intermediate cover 92 is fixed to the intermediate wall 91 by a plurality of bolts 94.

The drive sprocket 82 is rotatably supported by the intermediate cover 92 via the bush 81. The driven sprocket 83 is disposed below the drive sprocket 82. The drive sprocket 82 and the driven sprocket 83 are connected by the chain 84. Rotation directions of the drive sprocket 82 and the driven sprocket 83 are clockwise in FIG. 2.

The driven sprocket 83 is covered on both side surfaces and a lower side in a vertical direction by the baffle plate 86. A space in the case 90 in which the oil is stored is partitioned into a space in which the driven sprocket 83 is disposed and a space in which the oil strainer 72 communicating with the oil pump 70 to be described later is disposed. Thus, by separating the space in which the driven sprocket 83 is disposed, the oil strainer 72 is prevented from sucking air in the oil increased by the driven sprocket 83 and the chain 84 stirring the oil stored in the case 90.

The oil pump 70 is located on the left side (the depth of the page surface) of the vehicle 100 with respect to the driven sprocket 83, and is not illustrated in FIG. 2.

The oil strainer 72 for sucking up the oil stored in the case 90 is disposed at a bottom of the case 90 and between the gear power transmission mechanism 50 and the chain power transmission mechanism 80. The oil strainer 72 communicates with the oil pump 70, and the oil sucked up from the oil strainer 72 is supplied from the oil pump 70 and further from the oil pump 70 to the control valve unit 95.

The control valve unit 95 is attached to a front side (a right side in FIG. 2) of the vehicle 100 in the case 90. Oil is supplied from the oil pump 70 to the control valve unit 95. The control valve unit 95 includes a solenoid valve, a spool valve, and the like, and controls a hydraulic pressure supplied to the oil chamber of the primary pulley 21, the oil chamber of the secondary pulley 22, the forward/reverse switching mechanism 30, the lock-up clutch 41, and the like.

The fourth gear 54 of the gear power transmission mechanism 50 is fixed to the differential gear device 60. The first gear 51, the second gear 52, and the third gear 53 are disposed above the differential gear device 60. Rotation directions of the first gear 51, the second gear 52, the third gear 53, and the fourth gear 54 are clockwise, counterclockwise, counterclockwise, and clockwise in FIG. 2, respectively.

The secondary pulley 22 is located on the left side (the depth of the page surface) of the vehicle 100 with respect to the first gear 51, and is indicated by a broken line in FIG. 2.

A part of the fourth gear 54 is immersed in the oil stored in the case 90. That is, the gear power transmission mechanism 50 operates in a state where a part thereof is immersed in the oil. Accordingly, when the gear power transmission mechanism 50 is operated, oil is wound up by the gear power transmission mechanism 50.

Figure 3:
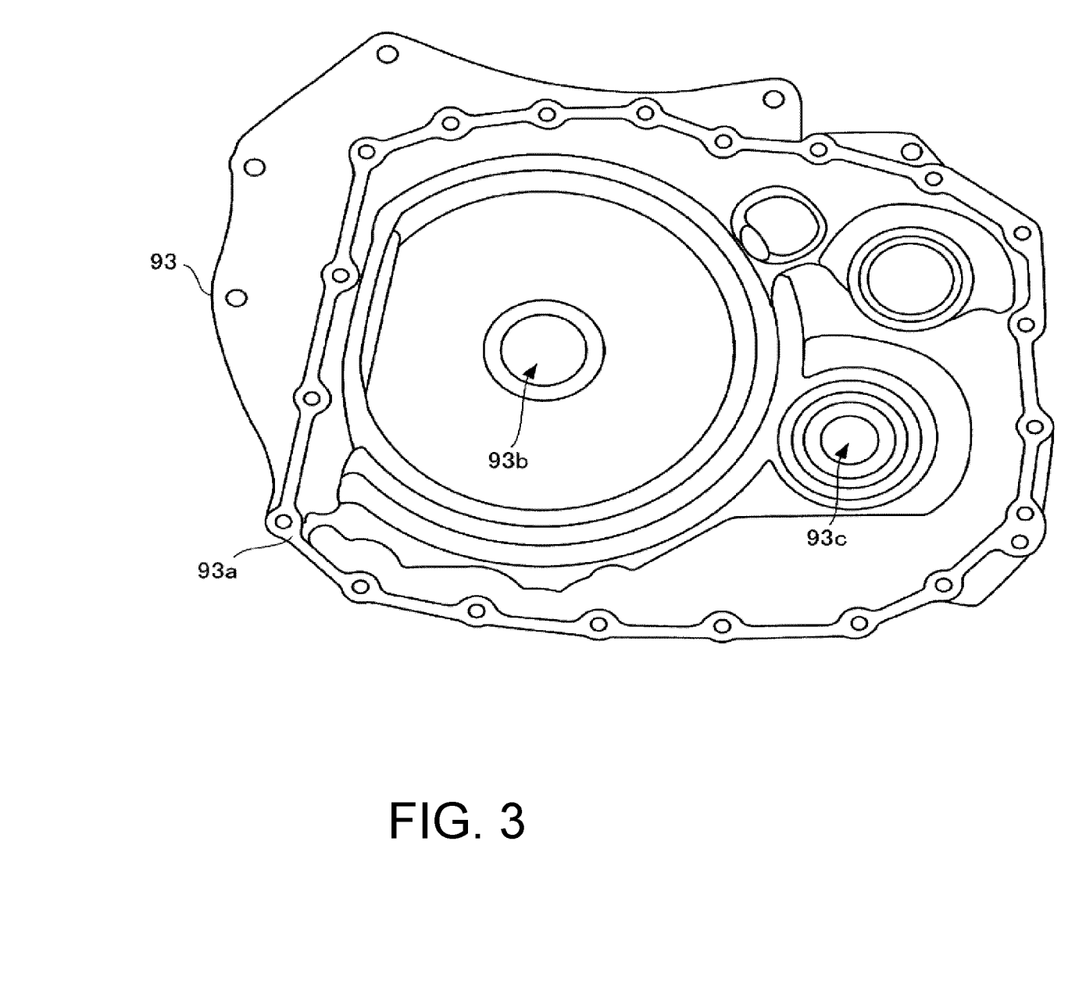
FIG. 3 is a view of a case cover as viewed from an inner surface side.

FIG. 3 is a view of the case cover 93 as viewed from an inner surface side.

The case cover 93 includes a flange 93a, a through hole 93b, and a through hole 93c.

The case cover 93 is fixed to the case 90 by a plurality of bolts (not illustrated) with the flange 93a facing the flange 91a (see FIG. 2) of the case 90.

The output shaft 43 of the torque converter 40 is inserted into the through hole 93b while the case cover 93 is fixed to the case 90. An output shaft (not illustrated) of the differential gear device 60 is inserted into the through hole 93c. The periphery of the through hole 93b is disposed to face the intermediate cover 92.

Therefore, when the gear power transmission mechanism 50 is operated, as indicated by an outlined arrow in FIG. 2, the oil wound up by the gear power transmission mechanism 50 is scattered toward the chain power transmission mechanism 80.

When the scattered oil is splashed on the chain power transmission mechanism 80, the oil becomes a further small splash, and the air contained in the oil increases. When the oil pump 70 sucks the oil, noise may be generated or the durability of the oil pump 70 may be affected. In addition, it is considered that a driving resistance of the drive sprocket 82 or the like increases as the air contained in the oil increases.

In the transmission 10 according to the present embodiment, the case 90, more specifically, a rib 96 that protrudes from a surface of the intermediate cover 92 and extends in a front-rear direction of the vehicle (the left-right direction in FIG. 2) is provided. By causing the rib 96 to function as partition walls that partition a space between the gear power transmission mechanism 50 and the chain power transmission mechanism 80, oil wound up by the gear power transmission mechanism 50 is prevented from being splashed on the chain power transmission mechanism 80.

A structure of the rib 96 will be described in detail.

As illustrated in FIG. 2, the rib 96 is disposed at a position on an upper side of the chain power transmission mechanism 80 in the vertical direction, and has an overall length longer than a diameter of the drive sprocket 82. Accordingly, the chain power transmission mechanism 80 is covered with the rib 96.

The rib 96 is disposed between the secondary pulley 22 and the control valve unit 95. An oil passage 96d for supplying oil from the control valve unit 95 to the secondary pulley 22 of the variator 20 is formed inside the rib 96. The oil passage 96d is connected to an oil passage (not illustrated) in the intermediate cover 92 and further to an oil passage 90a in the case 90, and communicates between the secondary pulley 22 and the control valve unit 95.

Accordingly, the rib 96 can have a plurality of functions of the partition wall and the oil passages, and a limited space in the transmission 10 can be effectively used. A length of an oil passage between the secondary pulley 22 and the control valve unit 95 can be shortened, and an oil passage structure in the transmission 10 can be simplified. Since the rib 96 is hollow by providing the oil passage 96d, an increase in weight can be prevented as compared with a case where a solid rib is provided.

The rib 96 is bent at a bent portion 96c at a substantially center in a longitudinal direction and has a shape protruding upward in the vertical direction, and is formed by a first linear portion 96a and a second linear portion 96b with the bent portion 96c therebetween.

Since the rib 96 is formed by the first linear portion 96a and the second linear portion 96b, an oil passage in the rib 96 can be easily formed by drilling. Specifically, first, when the intermediate cover 92 is cast, the rib 96 is integrally formed. At this time, the rib 96 is solid. Next, oil passages are formed in the linear portions 96a and 96b from both ends by a drill, and the oil passages are communicated with each other in the bent portion 96c. Finally, when openings at both ends of the rib 96 are sealed by plugs, the oil passage in the rib 96 can be formed.

The rib 96 can be provided not on the intermediate cover 92 but on the intermediate wall 91. When the intermediate cover 92 is provided as in the present embodiment, the oil passage 96d can be easily processed.

Since the rib 96 has a shape protruding upward in the vertical direction, the oil splashed on the rib 96 efficiently flows to both sides of the rib 96 in the longitudinal direction by utilizing the inclination, and an amount of oil reaching the chain power transmission mechanism 80 can be reduced. In order to reduce the amount of oil reaching the chain power transmission mechanism 80, it is advantageous as an entire length of the rib 96 is long. When the rib 96 is bent, it is also possible to dispose the rib 96 having a long overall length in a limited space around the drive sprocket 82.

A shape of the rib 96 is not limited thereto, and may be a linear shape without the bent portion 96c. Accordingly, an oil passage in the rib 96 can be easily formed. The rib 96 may be partially or entirely curved. When the rib 96 is curved, an internal oil passage cannot be formed by a drill, but an oil passage can be formed in the rib 96 by casting the curved pipe together when casting the intermediate cover 92.

Figure 4:
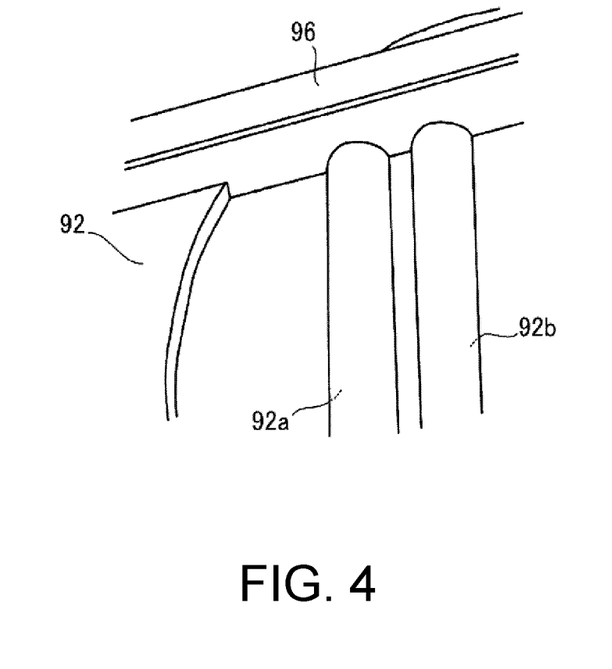
FIG. 4 is a partially enlarged perspective view of a rib.
Figure 5:
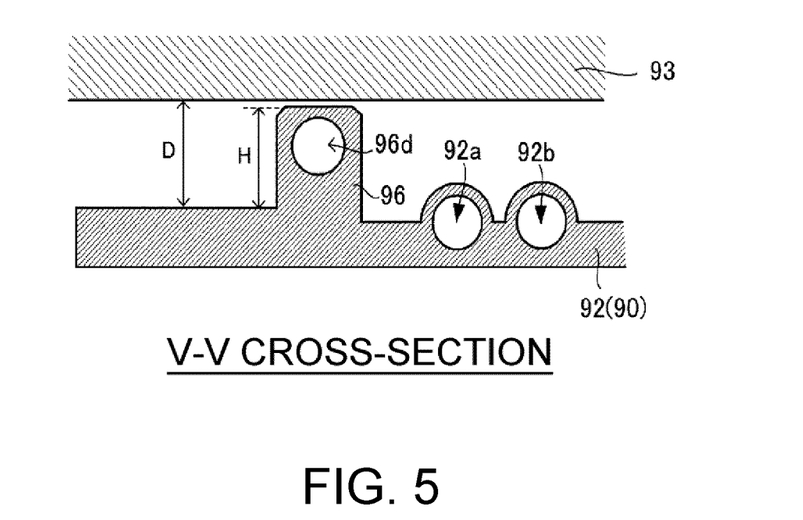
FIG. 5 is a cross-sectional view taken along a line V-V in FIG. 2.

FIG. 4 is a perspective view of a part of the rib 96 viewed from a direction indicated by an arrow IV in FIG. 2. FIG. 5 illustrates a schematic cross-section taken along a line V-V in FIG. 2.

A plurality of oil passages 92a to 92d are formed on a surface of the intermediate cover 92, and among these oil passages, the oil passages 92a and 92b intersect the rib 96. The oil passages 92a and 92b intersecting the rib 96 pass through a base end (root) side of the rib 96, and are disposed at an intersecting portion to be separated in a height direction of the oil passage 96d passing through the inside of the rib 96 and the rib 96. That is, the oil passage 96d and the oil passages 92a and 92b do not communicate with each other. Accordingly, the plurality of oil passages can be efficiently disposed in a limited space on the intermediate cover 92.

As illustrated in FIG. 5, a height H of the rib 96 is substantially equal to a distance D between the case 90 (the intermediate cover 92) and the case cover 93 at a portion where the rib 96 is provided. Accordingly, a gap between the rib 96 and the case cover 93 is reduced.

Since the oil wound up by the gear power transmission mechanism 50 strikes a left side surface of the rib 96 in FIG. 5, when a gap between the rib 96 and the case cover 93 is reduced, the amount of oil reaching the chain power transmission mechanism 80 beyond the rib 96 can be reduced.

The rib 96 has a rectangular cross-section. Accordingly, a surface (a left surface in FIG. 5) on an upper side of the rib 96 in the vertical direction is flat, and the oil scattered from the gear power transmission mechanism 50 and striking the rib can efficiently flow to both sides in the longitudinal direction of the rib 96. Therefore, the amount of oil reaching the chain power transmission mechanism 80 beyond the ribs 96 can be reduced.

Further, since a surface of the rib 96 facing the case cover 93 is flat, a length of a gap between the rib 96 and the case cover 93 in an up-down direction (a length in the left-right direction in FIG. 5) is long. Accordingly, the oil is less likely to pass through the gap between the rib 96 and the case cover 93, and the amount of oil reaching the chain power transmission mechanism 80 beyond the rib 96 can be reduced.

When the chain power transmission mechanism 80 is operated, the oil is also wound up by the chain power transmission mechanism 80. Since the amount of oil reaching the gear power transmission mechanism 50 is reduced due to the presence of the rib 96, an increase in an amount of air contained in the oil due to the oil wound up by the chain power transmission mechanism 80 is also prevented.

Main functions and effects of the transmission 10 implemented as described above will be described collectively.

(1) The transmission 10 according to the present embodiment includes: the case 90 configured to store oil; the gear power transmission mechanism 50 supported by the case 90 and configured to operate in a state where a part of the gear power transmission mechanism 50 is immersed in the oil stored in the case 90; the chain power transmission mechanism 80 supported by the case 90; and the variator 20 supported by the case 90.

The case 90 includes the rib 96 that covers the chain power transmission mechanism 80 at the upper side of the chain power transmission mechanism 80 in the vertical direction. The rib 96 internally includes the oil passage 96d for supplying oil to the variator 20.

Since the rib 96 that covers the chain power transmission mechanism 80 is provided, the rib 96 functions as a partition wall that partitions a space between the gear power transmission mechanism 50 and the chain power transmission mechanism 80, and the oil wound up by the gear power transmission mechanism 50 can be prevented from being splashed on the chain power transmission mechanism 80. Accordingly, the oil splashed on the chain power transmission mechanism 80 is further prevented from becoming a further small spray, and an increase in an amount of air contained in the oil can be prevented.

Since the rib 96 internally includes the oil passage 96d for supplying oil to the variator 20, the rib 96 can have a function as an oil passage in addition to a function as the partition wall, and a limited space in the transmission device 10 can be effectively used as compared with a case where the respective functions are realized by separate members. Since the rib 96 is hollow, an increase in weight due to the provision of the rib 96 can be prevented.

(2) The transmission 10 is a belt continuously variable transmission including the secondary pulley 22 that operates according to a hydraulic pressure of the oil supplied to an oil chamber and the control valve unit 95 that controls the hydraulic pressure of the oil supplied to the oil chamber. The rib 96 is disposed between the secondary pulley 22 and the control valve unit 95, and the oil passage 96d in the rib 96 is an oil passage for supplying oil from the control valve unit 95 to the oil chamber of the secondary pulley 22.

According to this configuration, the length of an oil passage between the secondary pulley 22 and the control valve unit 95 can be shortened, and the oil passage structure in the transmission 10 can be simplified.

(3) In addition, the case 90 includes other oil passages 92a and 92b separate from the oil passage 96d. The oil passages 92a and 92b pass through a base end side of the rib 96 and are separated from the oil passage 96d in the rib 96 in a height direction of the rib 96 in the rib 96 (FIGS. 4 and 5). In this way, by three-dimensionally disposing the plurality of oil passages 96d, 92a, and 92b using the rib 96, a plurality of oil passages can be efficiently disposed in the limited space on the intermediate cover 92.

(4) The case cover 93 fixed to the case 90 and configured to cover the gear power transmission mechanism 50 and the chain power transmission mechanism 80 is included. The height H of the rib 96 is substantially equal to the distance D between the case 90 (the intermediate cover 92) and the case cover 93 at the portion where the rib 96 is provided. Accordingly, the gap between the rib 96 and the case cover 93 is reduced, and the amount of oil reaching the chain power transmission mechanism 80 beyond the rib 96 can be further reduced.

Although the embodiment of the present invention has been described above, the above embodiment is merely an application example of the present invention and is not intended to limit the technical scope of the present invention to the specific configuration of the above embodiment.

For example, in the above embodiment, a case where the transmission 10 is a belt continuously variable transmission has been described. However, the transmission 10 may be a speed reduction device having a fixed speed ratio, a stepped transmission using planetary gears, or the like.

The present application claims a priority of Japanese Patent Application No. 2022-046422 filed with the Japan Patent Office on Mar. 23, 2022, all the contents of which are hereby incorporated by reference.

DESCRIPTION OF REFERENCE SIGNS 10 transmission
20 variator
22 secondary pulley
50 gear power transmission mechanism
80 chain power transmission mechanism
90 case
92 intermediate cover
92a oil passage (another oil passage)
92b oil passage (another oil passage)
93 case cover
95 control valve unit
96 rib
96d oil passage

The invention claimed is:

1. A transmission comprising:
a case configured to store oil;
a gear power transmission mechanism supported by the case and configured to operate in a state where a part of the gear power transmission mechanism is immersed in the oil stored in the case;
a chain power transmission mechanism supported by the case; and
a transmission mechanism supported by the case, wherein the case includes a rib configured to cover the chain power transmission mechanism at an upper side of the chain power transmission mechanism in a vertical direction, and the rib internally includes an oil passage for supplying oil to the transmission mechanism.

2. The transmission according to claim 1, wherein the transmission is a belt continuously variable transmission including a pulley configured to operate according to a hydraulic pressure of oil supplied to an oil chamber and a control valve unit configured to control the hydraulic pressure of the oil supplied to the oil chamber, the rib is disposed between the pulley and the control valve unit, and the oil passage in the rib is an oil passage for supplying oil from the control valve unit to the oil chamber of the pulley.

3. The transmission according to claim 1, wherein the case includes another oil passage separate from the oil passage, and the other oil passage passes through a base end side of the rib, and is separated from the oil passage in the rib in a height direction of the rib in the rib.

4. The transmission according to claim 1, further comprising:

a case cover fixed to the case and configured to cover the gear power transmission mechanism and the chain power transmission mechanism, and a height of the rib is substantially equal to a distance between the case and the case cover in a portion where the rib is provided.

* * * * *